UNITED STATES PATENT OFFICE.

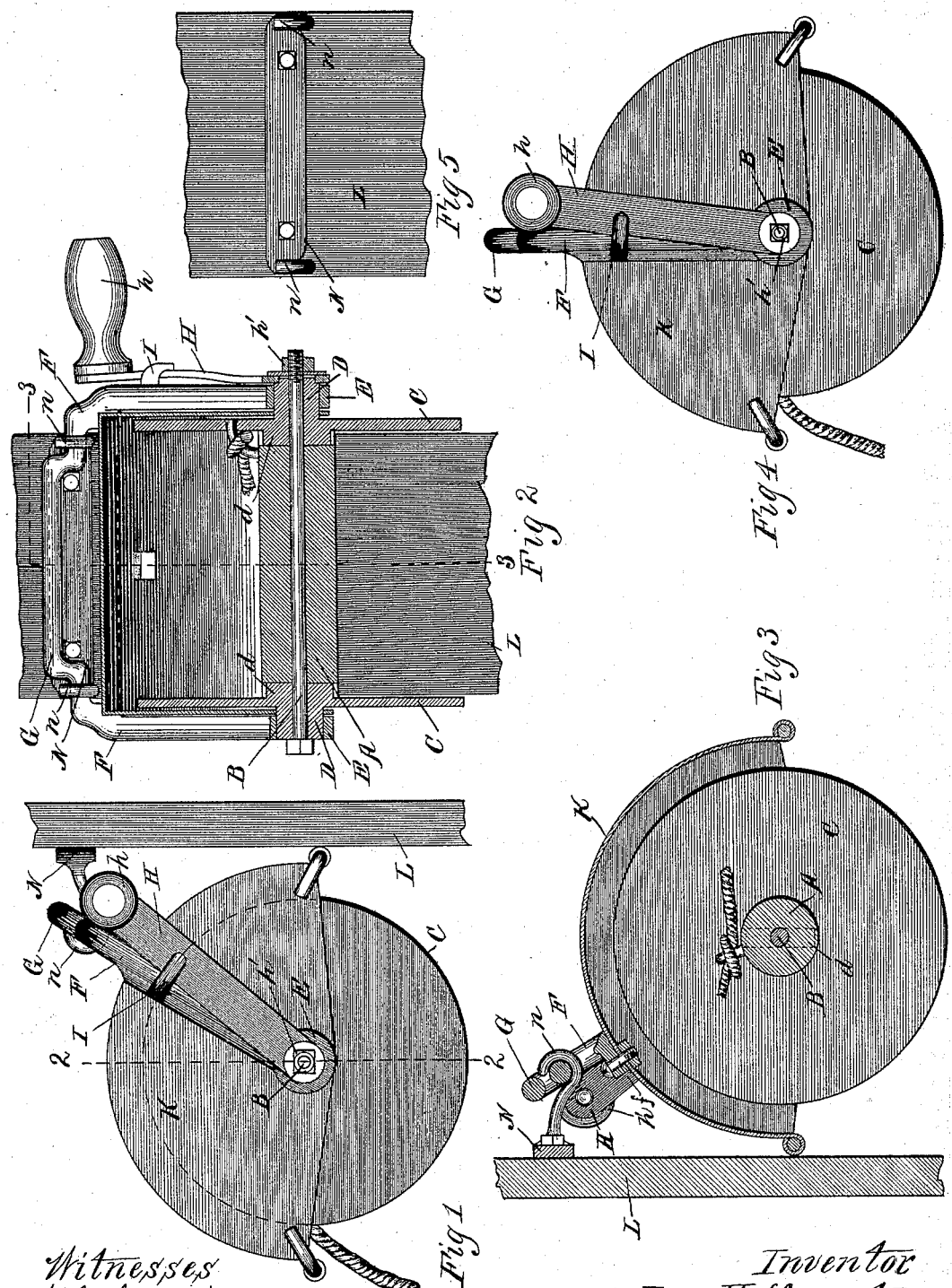

JOHN HOFFMEISTER, OF HINCKLEY, ILLINOIS.

CLOTHES-LINE REEL.

SPECIFICATION forming part of Letters Patent No. 470,674, dated March 15, 1892.

Application filed January 19, 1891. Serial No. 378,227. (No model.)

*To all whom it may concern:*

Be it known that I, JOHN HOFFMEISTER, a citizen of the United States, residing at Hinckley, in the county of DeKalb and State of Illinois, have invented a certain new and useful Improvement in Clothes-Line Reels, which is fully set forth in the following specification, reference being had to the accompanying drawings, in which—

Figure 1 is a side elevation of the clothes-line reel containing my invention. Fig. 2 is a longitudinal section taken on the line 2 2 of Fig. 1. Fig. 3 is a cross-section of the same on the line 3 3 of Fig. 2. Fig. 4 is a side elevation of the clothes-line reel detached from the post. Fig. 5 is a detail elevation of the hanger for the clothes-line reel attached to the post.

All the drawings are on the same scale.

My invention relates to improvements in clothes-line reels by which the clothes-line can be housed and secured when not in use, and also by means of which the line can be stretched from post to post when it is desired to suspend the clothes-line.

My invention consists in the arrangement and combination of various devices for accomplishing these purposes, as hereinafter set forth and claimed.

A is the drum or reel proper upon which the line is wound and from which it is unwound. The drum A is preferably of wood, and circular in form, though it may be square, if desired, and it is mounted upon an iron spindle B, which is rigidly secured in the hubs D of disks C, which form the sides of the reel.

*d d* are lugs forming part and cast in one piece with the hubs D and disks C, and which extend into the slots in the drum A at each end and secure the drum and disks together, so that they revolve with each other. The hubs D have their bearing in bosses E in the lower part of the frame F, which is enlarged to form the bosses. The frame F is U-shaped and is the main supporting-frame of the reel.

On the end or top piece of the U-shaped frame F is formed a bar G, usually cast in one piece with the frame, and by which the reel may be carried from place to place. The drum A is revolved by a hand-crank H and handle *h*, attached to the end of the crank. The crank H is rigidly mounted on the hub D, to which it is secured by a nut *h'*, which is screwed onto the end of the spindle B, which is extended beyond the hub, and screw-threaded to receive the nut. The crank H is made of steel or some elastic metal, and when not in use this handle is secured by pressing it toward the casting and under a hook I, which is formed on the frame F and is for the purpose of holding the handle whenever it is desired to stop the operation of the reel.

K is a housing or cover for the clothes-line when it is wound upon the drum A. It is preferably of sheet metal, semi-cylindrical in form, and extends over one-half or nearly one-half, the disks extending a sufficient distance over the disks to cover the clothes-line when on the drum, as before stated. The housing K is secured to the frame F by a screw-bolt *f*, passing through a boss on a cross-bar of the frame F and extending through the housing K, where it is secured by a nut on the screw-bolt. The housing K is so secured to the frame that when the line is stretched the housing will tilt upward, and when the line is slack the housing will drop over the reel and cover the line.

L shows a section of a post, to which is attached by any convenient method, usually screw-bolts, an iron strap N, at the ends of which are formed two hooks *n n*, adapted to engage with the bar G and suspend the clothes-line reel from the post, either after the line has been drawn out and suspended from post to post, or when the line is wound upon the drum.

The operation of my improvement is as follows: The clothes-line reel is suspended by the hooks *n n* of the strap N, which is attached to a post, and the clothes-line is then stretched from post to post until a sufficient quantity of line is unwound from the drum. The line is then made tight by means of turning the drum with the crank H, and when sufficiently tight the handle is pressed under the hook I, which secures it in its tightened position, and whenever it is desired to wind up the clothes-line the machine is taken from the hooks where it is suspended and then the line is wound upon the drum A by means of the crank H turning the drum.

Having thus described my invention, what I claim as new, and desire to secure by Letters Patent, is—

In a clothes-line reel, the combination of the housing K with the frame F, having bosses E, hook I, and handle-bar G, the drum A, the hubs D, the spindle B, the disks C, hand-crank H, and handle $h$, substantially as shown and described.

JOHN HOFFMEISTER.

Witnesses:
ALOYSIA HELMICK,
H. H. PALONS.